Jan. 13, 1925.
J. W. BATE
COLLAPSIBLE HANDLE
Filed Jan. 7, 1922
1,522,995
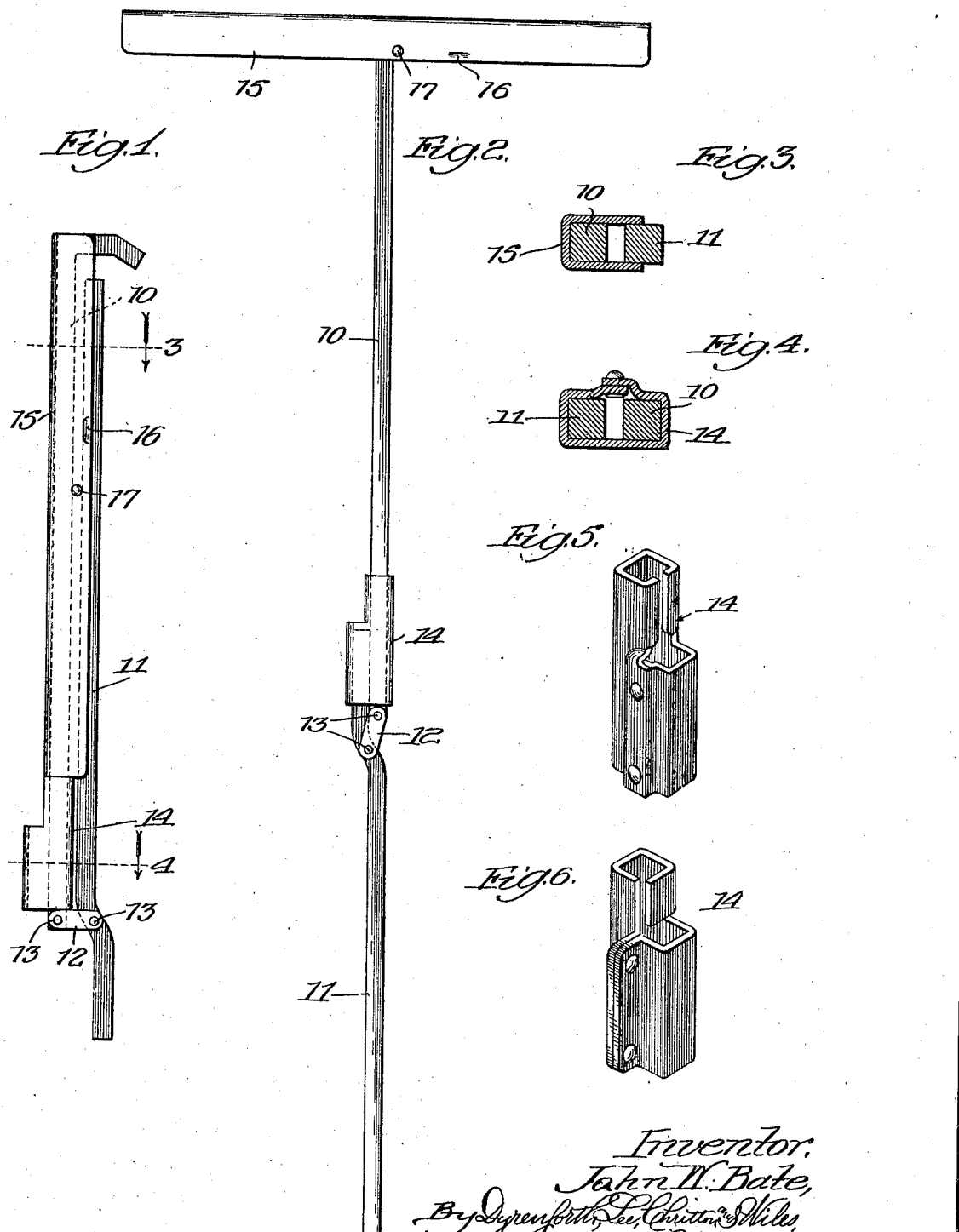

Patented Jan. 13, 1925.

1,522,995

UNITED STATES PATENT OFFICE.

JOHN W. BATE, OF RACINE, WISCONSIN.

COLLAPSIBLE HANDLE.

Application filed January 7, 1922. Serial No. 527,784.

*To all whom it may concern:*

Be it known that I, JOHN W. BATE, a citizen of the United States, residing at Racine, in the county of Racine and State of Wisconsin, have invented a new and useful Improvement in Collapsible Handles, of which the following is a specification.

This invention relates to collapsible handles and the like, and is particularly adapted to be used as a handle for screw-jacks and the like, where it is desirable that the handle shall fold up into as small a space as possible. This handle is fully described in the following specification and shown in the acompanying drawings, in which Figure 1 is a side elevation of the handle in a collapsed or folded position, Fig. 2 is the same in extended or operative position, Figs. 3 and 4 are enlarged transverse sections on the lines 3 and 4 of Fig. 1, Fig. 5 is a perspective view of sliding clamp for holding the two sections of the shaft, and Fig. 6 is a similar view of a modified form of clamp.

The handle, as illustrated, consists of upper and lower shaft sections 10 and 11, respectively, which are connected by means of a link 12, which is hingedly connected to both shaft members by means of pins 13. A clamp 14 is slidably mounted upon the shaft 10 and is adapted to slide over and enclose the upper end of the shaft 11, when the two are placed in alignment, as shown in Fig. 2. This permits the two to be rigidly locked together, so as to act as a single shaft.

The handle 15, by means of which the shafts 10 and 11 may be turned, is mounted upon the upper end of the shaft 10, as fully shown and described in my copending application, Serial No. 486,689, filed July 22nd, 1921. It is, therefore, not necessary to fully show and describe it in this application. It should be stated, however, that, when this handle is in the position shown in Fig. 2, it is retained therein by means of the indentation 16 and the rivet 17, and that this handle may be readily turned at right angles to the position shown in Fig. 2 and slid along the shaft 10, so as to assume the position shown in Fig. 1.

The shafts 10 and 11 may readily be folded into the position shown in Fig. 1 by pushing up the slide 14 until it releases the upper end of the shaft 11 and can be doubled back upon the shaft 10, as shown in Fig. 1.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible in view of the prior art.

What I claim as new and desire to secure by Letter Patent:

1. A collapsible handle comprising a shaft adapted to be folded near its middle, means for locking the parts of said shaft in alignment, an integral handle bar operably secured near its center on the outer end of said shaft for turning said shaft and movable to a position along said shaft and substantially enclosing one section of said shaft.

2. A collapsible handle comprising a shaft adapted to be folded near its middle, means for locking the parts of said shaft in alignment, a handle bar of U-shaped cross-section operably secured on the outer end of said shaft for turning said shaft and movable to a position along said shaft and partially enclosing the same.

3. A collapsible handle comprising a shaft adapted to be folded near its middle, means for locking the parts of said shaft in alignment, a handle bar operably secured on the outer end of said shaft to form a T therewith for turning said shaft and slidable to a position along said shaft, the combined length of the handle bar and locking means being substantially equal to the length of one of the parts of said shaft.

4. A collapsible handle comprising a shaft composed of two sections connected together by links, so that said sections may be folded together, a handle bar of U-shaped cross-section operably secured on the outer end of said shaft for turning said shaft and slidable to a position along said shaft and substantially enclosing the same, and a clip slidable on the upper section of the shaft for locking said sections in alignment, said clip being retained thereon by said handle bar and links.

5. A shaft composed of two sections connected together by links, so that said sections may be folded together, the end of one section being offset so as to lie along side the other section when the two sections are in alignment, and means slidable on the other section for engaging said offset end to hold the sections in alignment.

JOHN W. BATE.